United States Patent [19]

Shimo et al.

[11] Patent Number: 5,207,878

[45] Date of Patent: May 4, 1993

[54] METHOD FOR THE PREPARATION OF FINE PARTICULATE METAL-CONTAINING COMPOUND

[75] Inventors: Nobuo Shimo; Masato Fujita, both of Chiba, Japan

[73] Assignee: Idemitsu Kosan Company Limited, Chiba, Japan

[21] Appl. No.: 728,182

[22] Filed: Jul. 10, 1991

Related U.S. Application Data

[62] Division of Ser. No. 463,392, Jan. 11, 1990, Pat. No. 5,064,517.

[30] Foreign Application Priority Data

Jan. 18, 1989 [JP] Japan .................................. 1-7755
Jun. 14, 1989 [JP] Japan ................................ 1-149706

[51] Int. Cl.$^5$ ............................................. C01B 9/00
[52] U.S. Cl. ............................ 204/157.41; 204/157.48
[58] Field of Search ...................... 204/157.61, 157.41, 204/157.48

[56] References Cited

U.S. PATENT DOCUMENTS 4,230,546 10/1980 Ronn ............................ 204/157.61
4,558,017 12/1985 Gupta et al. .................. 204/157.41

*Primary Examiner*—John Niebling
*Assistant Examiner*—C. Delacroix-Muirheid
*Attorney, Agent, or Firm*—Wyatt, Gerber, Burke and Badie

[57] ABSTRACT

A finely divided metal-containing compound can be efficiently prepared by irradiating a mixed vapor phase of an organometallic compound in a concentration to exceed a specified lower limit and a reactant gaseous compound with laser beams having an incident energy density to exceed a specified lower limit. When the reactant gaseous compound in the vapor phase is an oxygen-containing compound, e.g., air, the resultant powdery product is an oxide of the metallic element of the organometallic compound. When the reactant gaseous compound in the vapor phase is a halogen-containing compound, e.g., methyl halides, the resultant powdery product is a halide of the metallic element of the organometallic compound. When the reactant gaseous compound is a second organometallic compound, of which the metallic element is not the same as the metallic element in the first organometallic compound, the resultant powdery product is a composite metallic powder of which the distribution of the two metallic elements is uniform throughout each particle. No particles of either one of the metallic elements alone are contained in the powder as evidenced by the EPMA analysis.

9 Claims, No Drawings

METHOD FOR THE PREPARATION OF FINE PARTICULATE METAL-CONTAINING COMPOUND

This application is a division of application Ser. No. 07/463,392, filed Jan. 11, 1990 now U.S. Pat. No. 5,064,517.

BACKGROUND OF THE INVENTION

The present invention relates to a method for the preparation of a metal compound in a fine particulate form or, more particularly, to a method for the preparation of a metal compound such as a halide, oxide and composite metal compound, i.e. compounds of at least two kinds of metallic elements, in a fine particulate form.

Fine powders of a metal oxide, for example, are widely used as a base material for the preparation of various kinds of ceramic-based electronic components by utilizing their unique properties. Several methods are known in the prior art for the preparation of a fine metal oxide powder, of which a typical method is the production of particles of a metal oxide in a vapor phase such as the so-called CVD method. A problem in the conventional vapor-phase methods is that the density of the metallic atoms in the vapor phase cannot be high enough so that the efficiency of the method also cannot be high. In addition, the vapor-phase reaction requires a large amount of energy in the form of, for example, light, plasma, electron beams, heat and the like resulting in high costs for the production with a problem in energy saving.

A method is known to prepare fine metal particles by the pyrolytic decomposition of a metal compound in the vapor phase. For example, Japanese Patent Kokai 60-51539 teaches a method for depositing fine metal particles from the vapor phase. Chemistry and Industry, volume 15, page 247 (1985) teaches a method in which an organometallic compound in the vapor phase is decomposed by means of laser beam irradiation.

These prior art methods by the decomposition of a metal compound in the vapor phase are disadvantageous economically and in respect of the product quality since, when the energy for the decomposition is given by a laser beam, at least one photon is required to effect the decomposition reaction to produce a molecule of the metal particle so that the costs for the energy are very great in view of the expensiveness of the laser beam per unit energy even by setting aside the problems in the difficulty encountered in the control of the reaction and formation of a relatively large amount of by-products.

Fine particles of a metal halide can be prepared by bringing a purified metal into contact with a halogen gas at an elevated temperature so that the metal directly reacts with the halogen to produce a metal halide in a fine particulate form. This method is also economically disadvantageous because of the large consumption of the thermal energy.

SUMMARY OF THE INVENTION

The present invention accordingly has an object to provide a novel and improved method for the preparation of a metal-containing compound in a fine particulate form or, in particular, for the preparation of a metal oxide, a metal halide or a composite metal compound in a fine particulate form by overcoming the above described problems and disadvantages in the prior art methods.

Thus, the method of the present invention for the preparation of a metal-containing compound in a fine particulate form comprises the steps of:

(a) admixing a vapor of an exothermically decomposable organometallic compound having a density of the molecules of the compound of at least $10^{15}$ molecules per ml in the vapor phase with a reactant compound capable of reacting with the organometallic compound to form a mixture in the vapor phase; and (b) irradiating at least a part of the vapor phase with energy rays having an energy density of at least $10^{-4}$ joule per $cm^2$ so as to produce activated species of the organometallic compound which start an exothermic chain reaction of the organometallic compound with the reactant compound to form fine particles of the metal-containing compound.

In particular, the reactant compound is an oxygen-containing compound, a halogen-containing compound or a metal-containing compound, of which the metallic element is not the same kind as that in the organometallic compound, when the desired metal-containing compound in a fine particulate form as the product of the inventive method is a metal oxide, metal halide or composite metal compound, respectively.

DETAILED DESCRIPTION OF THE PREFERRED EMBODIMENTS

The inventor has previously proposed an efficient method for the preparation of fine particles of a metal by irradiating a vapor phase of a metal-containing compound in a concentration to exceed a certain lower limit with energy rays having an energy density to exceed a certain energy density per unit area (see Japanese Patent Kokai 63-114909 and 64-11916).

The inventor has further continued investigations to develop an efficient method for the preparation of several kinds of metal-containing compounds in a fine particulate form starting from a vaporizable metal compound and arrived at a discovery that the object can be achieved when an organometallic compound in the vapor phase is admixed with a vapor of a suitable reactant compound and the gaseous mixture is irradiated with energy rays provided that the organometallic compound is exothermically decomposable, the density thereof in the vapor phase exceeds a certain lower limit and the energy density of the energy rays per unit area exceeds a certain lower limit, the reactant compound being selected depending on the type of the desired metal-containing compound, so that a chain reaction is started at the irradiated site in the vapor phase to be propagated throughout the whole volume of the vapor phase forming the desired metal-containing compound in a high yield.

One of the starting materials in the inventive method is an organometallic compound which is not particularly limitative provided that the compound is vaporizable to form a vapor phase of a concentration higher than the specified lower limit and that the compound is exothermically decomposable. Preferably, the organometallic compound is an alkylated metal compound such as tetraalkyl leads, trialkyl bismuths, trialkyl thalliums, dialkyl zincs, dialkyl mercuries, dialkyl cadmiums and the like though not particularly limitative thereto. The alkyl group in the above mentioned alkylated metal compounds can be straightly linear or branched and is preferably selected from the class consisting of methyl, ethyl, n-propyl and isopropyl groups.

It is essential that the organometallic compound used in the inventive method should be exothermically decomposable to produce an atom of the metal in the elementary form. Namely, the organometallic compound, which is expressed by the general formula of $M^1R^1_n$, where $M^1$ is an atom of a n-valent metal, $R^1$ is an alkyl group and n is a positive integer of, usually, 1 to 4, should be decomposed according to the following equation:

$$M^1R^1_n \rightarrow M^1 + n/2\, R^1.R^1.$$

Assuming that the dissociation energy of the starting compound in the first partial reaction $$M^1R^1_n \rightarrow M^1 + n\, R^1.$$

is given by $D_A$ and the recombination energy of the free radicals $R^1$. in the second partial reaction $$n\, R^1. \rightarrow n/2\, R^1.R^1$$

is given by $D_B$, then $\Delta H = D_A - D_B$. An exothermic reaction means that the value of this $\Delta H$ is negative. The reaction of the inventive method can proceed in a chain-like decomposition reaction by using an organometallic compound to meet this thermochemical requirement. It is preferable that the vapor pressure of the organometallic compound is as high as possible in order to give a high concentration of the compound in the vapor phase which ensures smooth initiation and propagation of the chain-like decomposition reaction thereof. For example, the alkyl groups in the alkylated metal compound should be a lower one, e.g., a methyl group, in this regard. It is also preferable that the absolute value of the $\Delta H$ should be as large as possible. Examples of the organometallic compound having a relatively large absolute value of $\Delta H$ include tetramethyl lead having a $\Delta H$ of $-25$ kcal/mole and trimethyl bismuth having a $\Delta H$ of $-30$ kcal/mole.

The reactant compound to be admixed with the organometallic compound in the vapor phase is selected naturally depending on the type of the desired metal-containing compound as the product. When the desired metal-containing compound to be obtained in a fine particulate form is an oxide of metal, for example, the reactant compound is a non-metal oxygen-containing compound without particular limitations provided that the compound can be in the form of a gas or vapor miscible with the vapor of the organometallic compound. The oxygen-containing compound should desirably have a relatively high vapor pressure and be readily decomposable. Examples of suitable oxygen source compounds include molecular oxygen or air and oxygen-containing gaseous compound such as nitrous oxide $N_2O$, nitrogen monoxide $NO$, nitrogen dioxide $NO_2$, sulfur dioxide $SO_2$ and the like in respect of the relatively high vapor pressure and high reactivity with the metallic element in the atomic form produced from the organometallic compound. In particular, air is preferred as the oxygen source in respect of the easiness and safety in handling and low costs. These oxygen-containing gaseous compounds can be used either singly or as a mixture of two kinds or more according to need.

When the mixture in the vapor phase of the above described organometallic compound and the oxygen-containing compound is irradiated, at least at a part of the vapor phase, with energy rays, such as laser beams, under the conditions described later, an exothermic chain reaction is initiated and propagated throughout the whole volume of the vapor phase to produce a metal oxide in a fine particulate form. The chain reaction proceeds by a mechanism involving partial reactions of a decomposition reaction and an oxidation reaction. The exothermic reaction here implied means a reaction in which the overall heat balance by the reaction is negative.

Assuming that the organometallic compound is an alkylated metal compound of the formula $M^2R^2_m$, in which $M^2$ is an atom of the metal, $R^2$ is an alkyl group and m is a positive rational number and the vapor of the organometallic compound is mixed with a vapor of an oxygen-containing compound of the formula $R^3_pO_q$, in which $R^3$ is an atom of, e.g., nitrogen or sulfur, p is zero or a positive rational number and q is a positive rational number, in a molar proportion of 1:x, x being a positive rational number, then the overall reaction is expressed by the reaction equation:

$$M^2R^2_m + xR^3_pO_q \rightarrow M^2.O_{qx} + R^2_m + R^3_{px} \quad \text{(Equation I)}$$

or $$M^2R^2_m + xR^3_pO_q \rightarrow M^2.O_{qx} + R^2_m.R^3_{px} \quad \text{(Equation Ia)}.$$

$R^2_m$ in the above given Equation I is the most stable alkane compound formed by the recombination reaction of m radicals $R^2$ formed by the decomposition reaction and $R^3_{px}$ is the most stable compound formed from px atoms of $R^3$ or px molecules of $R^3$ formed from x moles of the oxygen-containing compound $R^3_pO_q$.

$R^2_m.R^3_{px}$ is the most stable compound formed by the reaction of m radicals of $R^2$. and px atoms of $R^3$ or px molecules of $R^3$.

When $D_A + D_B - D_C - D_D < 0$ in this reaction, assuming that $D_A$ is the dissociation energy of the reaction $M^2R^2_m \rightarrow M^2 + mR^2$, $D_B$ is the dissociation energy of the reaction $R^3_pO_q \rightarrow pR^3 + q/2\, O_2$ multiplied by a factor x, $D_C$ is the recombination energy of the reaction $M^2 + x(q/2)\, O_2 \rightarrow M^2.O_{qx}$ and $D_D$ is the sum of the recombination energy of the reaction $mR^2 \rightarrow R^2_m$ as the most stable alkane compound and the recombination energy of the reaction $pxR^3 \rightarrow R^3_{px}$ (in Equation I) or the recombination energy of the reaction $mR^2 + pxR^3 \rightarrow R^2_m.R^3_{px}$ (in Equation Ia), then an exothermic reaction takes place to generate heat of reation, by which a chain reaction proceeds to form the metal oxide $M^2.O_{qx}$.

When the desired metal-containing compound in a fine particulate form as the product is a halogen compound of the metal, the reactant compound to be reacted with the organometallic compound according to the inventive method is a non-metal halogen-containing compound which is not particularly limitative provided that the compound contains at least one atom of a halogen, i.e. fluorine, chlorine, bromine and iodine, in a molecule and is capable of being in a gaseous form. It is preferable that the vapor pressure of the compound is as high as possible and the compound is readily decomposable. Examples of suitable halogen-containing compounds include methyl fluoride, methyl chloride, methyl bromide and methyl iodide as well as molecular halogens such as fluorine $F_2$, chlorine $Cl_2$, bromine $Br_2$ and iodine $I_2$. These halogen-containing compounds can be used either singly or as a combination of two kinds or more according to need. Similar discussions can be held on the mechanism of the reaction of the organometallic compound and the halogen-containing compound to form a metal halide to the discussions given for the reaction to form a metal oxide.

When the desired product is a composite metal compound, i.e. a compound of two kinds or more of metallic elements, in a fine particulate form, the reactant to be reacted with the organometallic compound is a metal-containing compound of which the metallic element is different from that in the organometallic compound. The reactant metal-containing compound is not particularly limitative provided that the compound can be in a gaseous form. Examples of suitable reactant metal-containing compounds include organometallic compounds having a metal-to-carbon linkage, hydrides, alkoxides, carbonyls, metallocene compounds, halides, hydroxides, oxides, carbides, nitrides, sulfides and the like of a metallic or metalloid element, such as lead, bismuth, thallium, zinc, aluminum, cadmium, mercury, gold, silver, platinum, cobalt, nickel, iron, tin, silicon, germanium and the like. These metal or metalloid compounds can be used either singly or as a combination of two kinds or more according to need.

It is preferable that the reactant metal-containing compound is exothermically decomposable with a relatively small dissociation energy and that the compound has a relatively high vapor pressure. In this regard, preferable reactant metal-containing compounds include the above mentioned organometallic compounds, e.g., tetramethyl lead, trimethyl bismuth, trimethyl thallium and the like, and metal halides in respect of their relatively high vapor pressure. Metal carbonyl compounds, e.g., iron carbonyl, nickel carbonyl, chromium carbonyl, molybdenum carbonyl, tungsten carbonyl and the like, are also preferable in respect of their relatively small dissociation energy to permit decomposition of the compound into the metal in an atomic state. Needless to say, the metallic element of these reactant metal-containing compounds is of a different kind from that in the organometallic compound to be reacted with these reactants. Similar discussions can be held on the mechanism of the reaction of the organometallic compound and the above defined reactant metal-containing compound to form a composite metal compound to the discussions given for the reaction to form a metal oxide.

Following is a particular discussion on the mechanism of the reaction. Assume that a reaction equation

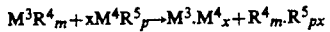

is held for the reaction taking place in a vapor phase of a mixture of an organometallic compound of the formula $M^3R^4_m$, in which $M^3$ is an atom of a first metallic element, $R^4$ is an alkyl group and m is a positive rational number, and a metal-containing reactant compound of the formula $M^4R^5_p$, in which $M^4$ is an atom of a second metallic element different from $M^3$, $R^5$ is a non-limitative radical to form the metal-containing compound or, preferably, an alkyl group, halogen atom or carbonyl group, and p is zero or a positive rational number, in a molar proportion of 1:x, x being a positive rational number. When $D_E+D_F-D_G-D_H$ in this reaction is negative, then an exothermic reaction takes place in the vapor phase resulting in proceeding of a chain reaction by the heat of reaction to produce a composite metal compound of the formula $M^3.M^4_x$. The above given $D_E$, $D_F$, $D_G$ and $D_H$ are defined as: $D_E$ is the dissociation energy of $M^3R^4_m$ into $M^3+mR^4$; $D_F$ is the dissociation energy of $M^4R^5_p$ into $M^4+pR^5$ multiplied by a factor x; $D_G$ is the recombination energy of $M^3$ and $xM^4$ into $M^3.M^4_x$; and $D_H$ is the overall recombination energy of $mR^4$ and $pR^5$ into $R^4_m.R^5_p$.

When a mixture of vapors of the organometallic compound and the reactant compound is irradiated with energy rays according to the inventive method, the concentration of the vapor of the organometallic compound in the vapor phase should be selected in consideration of the absorption coefficient of the energy rays by the vapor mixture. For example, the chain-like decomposition reaction can be initiated even with a relatively low concentration of the vapor when the absorption coefficient is increased by adequately selecting the frequency of the energy rays for irradiation. At any rate, the concentration of the organometallic compound in the vapor phase should be at least $10^{15}$ molecules per $cm^3$ or, preferably, at least $10^{16}$ molecules per $cm^3$ or, more preferably, at least $10^{17}$ molecules per $cm^3$. When the concentration is too low, the concentration of the active species produced by the energy ray irradiation is also too low to initiate the chain reaction because the active species are deactivated to an ineffective concentration level before a reaction takes place between the active species and the reactant compound.

The concentration of the reactant compound in the vapor phase naturally depends largely on the type of the reactant compound. When the desired product is a metal oxide, for example, the concentration of the reactant oxygen-containing compound in the vapor phase should be at least equimolar to the organometallic compound as calculated for the oxygen molecules $O_2$. When the desired product is a metal halide, the concentration of the reactant halogen-containing compound in the vapor phase should be at least four times by moles relative to the organometallic compound as calculated for the halogen atoms.

The vapor mixture of the organometallic compound and the reactant compound can be diluted, if desired, by adding a suitable diluent gas inert to the reaction such as nitrogen, hydrogen, argon, helium and the like with an object to control the particle size distribution of the product. The degree of dilution, however, should not be too high in order to have the chain reaction proceeding smoothly. When the desired product is a composite metal compound, for example, the concentration of the diluent gas is preferably not higher than five times by moles relative to the total concentration of the organometallic compound and the reactant metal-containing compound.

The type of the energy rays to irradiate the vapor mixture is not particularly limitative provided that active species of the organometallic compound can be produced in a high concentration by the irradiation. Examples of suitable energy rays include electromagnetic waves exemplified by coherent light emitted from lasers, non-coherent light emitted from mercury lamps, xenon lamps and the like, orbital radiations, microwaves and X-rays and particle beams exemplified by ion beams, electron beams and plasma, of which laser beams, orbital radiations and X-rays are preferable or, laser beams are more preferable.

The laser beams should preferably be emitted from a high-output pulse laser. Particular examples of suitable lasers include excimer lasers and nitrogen lasers oscillating in the ultraviolet region, carbon dioxide gas lasers, carbon monoxide lasers, YAG lasers, glass lasers, ruby lasers and alexandrite lasers oscillating in the infrared region and YAG lasers oscillating in the visible region to emit harmonics, copper-vapor lasers, gold-vapor lasers, dye lasers, argon ion lasers, krypton ion lasers and the like.

Organometallic compounds in general have high absorptivity of light in the ultraviolet region so that the active species thereof can be produced easily in a high concentration in the vapor phase by using a laser oscillating in the ultraviolet region among those named above. Excimer lasers are particularly preferable in this regard along with the relatively high energy density. Carbon dioxide gas lasers are also preferable because of the multiphoton excitation of the vibrational level possessed by the organometallic compound in the infrared region leading to decomposition of the compound. It is of course that the chain-like decomposition reaction can take place even by using a laser of other types emitting a laser beam of a wavelength at which the organometallic compound has no excitation level because the phenomenon of break-down can take place in general by the irradiation with laser beams. Although the energy rays used in the inventive method can be a continuous emission, it is preferable to use a pulse-wise emission of the energy rays in respect of the higher density of the active species easily obtained by the irradiation therewith. The energy density of the energy rays incident on the vapor phase in the inventive method should be as high as possible in order to increase the efficiency of the method.

It is an advantageous condition that the width of a single pulse of the pulse-wise irradiation in the inventive method be as small as possible so as to produce the active species in a unit time in a concentration as high as possible. In this regard, the width of a single pulse should not exceed $10^{-3}$ second or, preferably, should not exceed $10^{-4}$ second or, more preferably, should not exceed $10^{-6}$ second. The concentration of the activated species can not always be increased even by increasing the length of the irradiation time by a single pulse because of the increase in the probability of deactivation of the active species.

The energy density of the energy rays for irradiation should be at least $10^{-4}$ joule per cm$^2$ or, preferably, at least $10^{-3}$ joule per cm$^2$ of the cross section. When the energy density is too low, the chain reaction for the decomposition of the organometallic compound can hardly be started.

It is desirable that the irradiation with energy rays should be performed under such conditions that the organometallic compound under irradiation may have a large absorption coefficient of the radiation energy or a large extinction coefficient of light when the energy source is a laser. When tetramethyl lead is used as the organometallic compound, for example, quite satisfactory results can be obtained by using an ArF excimer laser emitting a beam at a wavelength of 193 nm since the maximum in the extinction coefficient of the compound is at a wavelength of about 200 nm.

When the vapor mixture of the organometallic compound and the reactant compound is irradiated on at least a part under the above described conditions, active species are produced in the irradiated site of the vapor phase in a concentration of $10^{15}$/cm$^3$ or higher or, under preferable conditions, $10^{16}$/cm$^3$ or higher, which initiate the exothermic chain reaction propagating to the whole volume of the vapor phase so that the reaction to form the desired metal-containing compound is almost instantaneously completed through the decomposition of the reactants followed by the recombination reaction of the dissociated species.

It is also a possible way to obtain a metal oxide or metal halide which is a composite metal oxide or composite metal halide containing two kinds or more of metallic elements when the vapor mixture irradiated with the energy rays contains an additional metal compound capable of giving a vapor and capable of being exothermically decomposed, of which the metallic element is different from that in the organmetallic compound. Such an auxiliary metal-containing compound can be the same one as in the preparation of a composite metal compound. The thus obtained composite metal oxide or composite metal halide is not a mere blend of the respective metal oxide powders or metal halide powders but a submicroscopically intimate mixture of the components.

The product of the inventive method is obtained usually in a fine particulate form of which the particle diameter rarely exceeds 1.0 $\mu$m or is mostly smaller than 0.3 $\mu$m when the product is the metal oxide or metal halide and rarely exceed 5 $\mu$m and is mostly smaller than 0.5 $\mu$m when the product is the composite metal compound.

In the following, examples are given to illustrate the inventive method in more detail but not to limit the scope of the invention in any way.

EXAMPLE 1

Vapor of tetramethyl lead was introduced at 22° C. into a glass-made reaction vessel of 100 ml capacity in such an amount that the pressure inside the vessel was about 10 Torr corresponding to a density of the compound molecules of $3.3 \times 10^{17}$ molecules/cm$^3$ and then air was introduced into the vessel to give a partial pressure of 155 Torr corresponding to a concentration of air of $5.7 \times 10^{18}$ molecules/cm$^3$ or an oxygen partial pressure of 31 Torr corresponding to an oxygen concentration of $1.1 \times 10^{18}$ molecules/cm$^3$. The vapor mixture in the vessel was irradiated through the quartz glass-made window on the wall with a single pulse-wise flash of laser beams at a wavelength of 193 nm emitted from an ArF excimer laser. The pulse width was $10^{-8}$ second and the energy density was $5.0 \times 10^{-2}$ J/cm$^2$ to give an irradiation dose of 200 mJ. Deposition of fine particles was found on the wall of the vessel after emission of a very strong flash of light indicating an explosively rapid reaction taking place in the vapor phase. The thus obtained powder, weighing 9 mg, was lead oxide having a particle diameter not exceeding 0.5 $\mu$m.

The results of this powdery product by the plasma-emission spectrophotometric analysis and CHN Coder indicated complete absence of the elements of carbon, hydrogen and nitrogen and the content of lead was 84% by weight. When the same experimental procedure as above was repeated excepting omission of introduction of air into the reaction vessel, the powdery product contained 98% by weight of lead. This difference in the content of lead is due to the formation of an oxide in the presence of the molecular oxygen. The X-ray photoelectron spectrophotometric analysis of the powdery product indicated a peak ascribable to oxygen O(1s) in the vicinity of 529.5 eV supporting the conclusion that this powdery product was an oxide of lead.

EXAMPLE 2

Vapor of trimethyl bismuth was introduced at 22° C. into a glass-made reaction vessel of 100 ml capacity in such an amount that the pressure inside the vessel was about 20 Torr corresponding to a density of the compound molecules of $6.6 \times 10^{17}$ molecules/cm$^3$ and then air was introduced into the vessel to give a partial pressure of 140 Torr corresponding to a concentration of air of $4.6 \times 10^{18}$ molecules/cm$^3$. The vapor mixture in the vessel was irradiated through the quartz glass-made window on the wall with a single pulse-wise flash of laser beams at a wavelength of 193 nm emitted from an ArF excimer laser. The pulse width was $10^{-8}$ second and the energy density was $3.8 \times 10^{-2}$ J/cm$^2$ to give an irradiation dose of 150 mJ. Deposition of fine particles was found on the wall of the vessel after emission of a very strong flash of light indicating an explosively rapid reaction taking place in the vapor phase. The thus obtained powder, weighing 25 mg, was bismuth oxide having a particle diameter not exceeding 0.3 μm.

The results of this powdery product by the X-ray photoelectron spectrophotometric analysis making reference to a standard sample of bismuth oxide Bi$_2$O$_3$ indicated good coincidence between the product and the standard to give the excitation energies of 158.7 eV and 158.5 eV, respectively, for Bi(4f 7/2) and 529.7 eV and 529.4 eV, respectively, for O(1s).

COMPARATIVE EXAMPLE 1

The experimental procedure was substantially the same as in Example 1 except that the energy density of the laser beam irradiation was $7.5 \times 10^{-5}$ J/cm$^2$ and the irradiation dose was 0.3 mJ. No explosive chain reaction was noted in the vapor phase.

COMPARATIVE EXAMPLE 2

The experimental procedure was substantially the same as in Example 1 excepting replacement of the air introduced into the reaction vessel with pure nitrogen gas. No explosive chain reaction was noted in the vapor phase.

COMPARATIVE EXAMPLE 3

The experimental procedure was substantially the same as in Example 1 except that the concentration of the tetramethyl lead vapor was $3.3 \times 10^{14}$ molecules/cm$^3$ to give a partial pressure of 0.01 Torr. No explosive chain reaction was noted in the vapor phase.

EXAMPLE 3

Vapor of tetramethyl lead was introduced at 22° C. into a quartz glass-made cell of 7 ml capacity in a concentration of $3.3 \times 10^{17}$ molecules/cm$^3$ to give a partial pressure of 10.0 Torr and then vapor of methyl iodide was additionally introduced thereinto in a concentration of $6.4 \times 10^{17}$ molecules/cm$^3$ to give a partial pressure of 19.3 Torr. The vapor mixture in the cell was irradiated with a single pulse of laser beams having a wave length of 248 nm emitted from a KrF excimer laser. The pulse width of the beams was $1 \times 10^{-8}$ second and the energy density of the incident laser beams was 75 mJ/cm$^2$ to give an irradiation dose of 300 mJ. Deposition of a fine yellow powder was found on the wall of the cell after emission of a very strong flash of orange light indicating an explosively rapid reaction taking place in the cell. The powdery product, weighing about 1.7 mg, had a particle diameter not exceeding 0.3 μm.

This powdery product was subjected to the X-ray photoelectron spectrophotometric analysis to give the chart peaks at wavelengths of about 619.1 eV for iodine and about 138.5 eV for lead. The corresponding excitation energies for a standard sample of lead diiodide PbI$_2$ were 619.0 eV and 136.4 eV, respectively. These values for lead are in good coincidence with value of 138.5 eV reported in Journal of Physical Chemistry, volume 77, page 96 (1973) by W. E. Morgan et al. These results support the conclusion that the powdery product was lead diiodide.

EXAMPLE 4

Vapor of tetramethyl lead was introduced at 22° C. into a quartz glass-made cell of 7 ml capacity in a concentration of $8.3 \times 10^{17}$ molecules/cm$^3$ to give a partial pressure of 25.0 Torr and then vapor of methyl bromide was additionally introduced thereinto in a concentration of $2.6 \times 10^{18}$ molecules/cm$^3$ to give a partial pressure of 77.9 Torr. The vapor mixture in the cell was irradiated with a single pulse of laser beams having a wave length of 193 nm emitted from an ArF excimer laser. The pulse width of the beams was $1 \times 10^{-8}$ second and the energy density of the incident laser beams was 50 mJ/cm$^2$ to give an irradiation dose of 200 mJ. Deposition of a fine powder was found on the wall of the cell after a very strong flash of orange light indicating an explosively rapid reaction taking place in the cell. The powdery product, weighing about 2.8 mg, had a particle diameter not exceeding 0.3 μm.

This powdery product was subjected to the X-ray photoelectron spectrophotometric analysis and the results were compared with those obtained with a commercially available sample of lead bromide to find good coincidence supporting the conclusion that this powdery product was lead bromide.

EXAMPLE 5

Vapor of tetramethyl lead was introduced at 22° C. into a quartz glass-made cell of 7 ml capacity in a concentration of $8.3 \times 10^{17}$ molecules/cm$^3$ to give a partial pressure of 25.0 Torr and then vapor of methyl chloride was additionally introduced thereinto in a concentration of $1.6 \times 10^8$ molecules/cm$^3$ to give a partial pressure of 48.0 Torr. The vapor mixture in the cell was irradiated with a single pulse of laser beams having a wave length of 193 nm emitted from an ArF excimer laser. The pulse width of the beams was $1 \times 10^{-8}$ second and the energy density of the incident laser beams was 50 mJ/cm$^2$ to give an irradiation dose of 200 mJ. Deposition of a fine powder was found on the wall of the cell after a very strong flash of orange light indicating an explosively rapid reaction taking place in the cell. The powdery product, weighing about 2.6 mg, had a particle diameter not exceeding 0.3 μm.

This powdery product was subjected to the X-ray photoelectron spectrophotometric analysis and the results were compared with those obtained with a commercially available sample of lead dichloride to find good coincidence supporting the conclusion that this powdery product was lead dichloride.

EXAMPLE 6

The experimental procedure was substantially the same as in Example 3 excepting replacement of the tetramethyl lead with trimethyl bismuth. An explosive chain reaction took place in the cell to produce about 3.5 mg of a fine powder of bismuth iodide having a particle diameter not exceeding 0.3 μm.

COMPARATIVE EXAMPLE 4

The experimental procedure was substantially the same as in Example 3 except that the energy density of the laser beam irradiation was 0.075 mJ/cm$^2$ instead of 75 mJ/cm$^2$ and the irradiation dose was 0.3 mJ instead of 300 mJ.

The results were that no explosive chain reaction took place in the cell.

COMPARATIVE EXAMPLE 5

The experimental procedure was substantially the same as in Example 3 except that the density of the tetramethyl lead was $3.3 \times 10^{14}$ molecules/cm$^3$ to give a partial pressure of 0.01 Torr instead of $3.3 \times 10^{17}$ molecules/cm$^3$.

The results were that no explosive chain reaction took place in the cell.

EXAMPLE 7

Vapor of tetramethyl lead was introduced at 22° C. into a glass-made reaction vessel of 100 ml capacity in such an amount that the pressure inside the vessel was about 15 Torr corresponding to a density of the compound molecules of $4.9 \times 10^{17}$ molecules/cm$^3$ and then vapor of trimethyl bismuth was introduced into the vessel to give a partial pressure of 5 Torr corresponding to a concentration of the compound of $1.6 \times 10^{17}$ molecules/cm$^3$. The vapor mixture in the vessel was irradiated through the quartz glass-made window on the wall with a single pulse-wise flash of laser beams at a wavelength of 193 nm emitted from an ArF excimer laser. The pulse width was $1 \times 10^{-8}$ second and the energy density was $2.5 \times 10^{-2}$ J/cm$^2$ to give an energy input of 100 mJ corresponding to $9.7 \times 10^{16}$ photons. Deposition of fine particles was found on the wall of the vessel after a very strong flash of orange light indicating an explosively rapid reaction taking place in the vapor phase. The amount of the thus obtained powdery product was about 18 mg. The powder had a particle diameter not exceeding 5 μm and analysis of the same indicated that it was a composite metallic powder of lead and bismuth.

The same experimental procedure as above was repeated except that the mixing ratio of the tetramethyl lead vapor and trimethyl bismuth vapor was varied. When the concentrations of tetramethyl lead vapor and the trimethyl bismuth in the reaction vessel were $3.3 \times 10^{17}$ molecules/cm$^3$ to give a partial pressure of 10 Torr and also $3.3 \times 10^{17}$ molecules/cm$^3$ to give a partial pressure of 10 Torr, respectively, about 18 mg of a powdery product of composite metal particles having a particle diameter not exceeding 2 μm were obtained. When the concentrations of tetramethyl lead vapor and the trimethyl bismuth vapor in the reaction vessel were further varied to be $1.6 \times 10^{17}$ molecules/cm$^3$ to give a partial pressure of 5 Torr and also $4.9 \times 10^{17}$ molecules/cm$^3$ to give a partial pressure of 15 Torr, respectively, the amount of the powdery product of composite metal particles having a particle diameter not exceeding 1 μm was also about 18 mg.

The above described yields of the powdery product indicated that about 670 molecules of the organometallic compounds had been instantaneously decomposed into a metallic form by the irradiation with a single photon. This means that the energy efficiency in the inventive method is at least 700 times higher than in the conventional photochemical methods.

The particles of the composite metal powders obtained above were subjected to the examination of the distribution of the elements of lead and bismuth by using an electron probe microanalyzer (EPMA) to find that good coincidence was obtained between the distribution patterns of lead and bismuth. Further, the estimated relative contents of lead and bismuth in the particles were about the same as in the vapor phase. The EPMA photographs showed no particles composed of the single metal of lead alone or bismuth alone. These results support the conclusion that the composite metal powder obtained by the inventive method is very unique as compared with any composite metal powders obtained by conventional methods.

EXAMPLE 8

The experimental procedure was substantially the same as in Example 7 except that the vapor mixture in the reaction vessel was composed of tetramethyl lead vapor in a concentration of $3.3 \times 10^{17}$ molecules/cm$^3$ corresponding to a partial pressure of 10 Torr and tetramethyl tin vapor in a concentration of $1.6 \times 10^{17}$ molecules/cm$^3$ corresponding to a partial pressure of 5 Torr. Deposition of a fine powder was found on the wall of the reaction vessel after a strong flash of orange light. The amount of the thus produced composite metal powder, which had a particle diameter not exceeding 0.3 μm, was about 16 mg. The EPMA analysis of this composite metal powder indicated that the distributions of lead and tin were uniform throughout all of the particles and the ratio of the contents of these elements in the particles was about the same as in the vapor mixture. This is a very unique result in contrast to the general understanding that tetramethyl tin is hardly susceptible to a chain-like decomposition reaction by a single pulse irradiation with laser beams.

COMPARATIVE EXAMPLE 6

The experimental procedure was substantially the same as in the first experiment of Example 7 except that the energy density of the incident laser beams was $2.5 \times 10^{-2}$ mJ/cm$^2$ to give an energy input of 0.1 mJ. No chain reaction for the decomposition of the organometallic compounds took place in the vapor mixture.

COMPARATIVE EXAMPLE 7

The experimental procedure was substantially the same as in Example 7 except that the vapor mixture in the reaction vessel was composed of tetramethyl lead vapor in a concentration of $3.3 \times 10^{14}$ molecules/cm$^3$ corresponding to a partial pressure of 0.01 Torr and trimethyl bismuth vapor in a concentration of $3.3 \times 10^{14}$ molecules/cm$^3$ corresponding to a partial pressure of 0.01 Torr. No chain reaction for the decomposition of the organometallic compounds took place in the vapor mixture.

COMPARATIVE EXAMPLE 8

The experimental procedure was substantially the same as in Example 7 except that the vapor mixture in the reaction vessel was composed of tetramethyl tin having a ΔH of 30 kcal/mole in a concentration of $4.9 \times 10^{17}$ molecules/cm$^3$ corresponding to a partial pressure of 15 Torr and tetramethyl germanium having a ΔH of 65 kcal/mole in a concentration of $1.7 \times 10^{17}$ molecules/cm$^3$ corresponding to a partial pressure of 5

Torr. No chain reaction for the decomposition of the organometallic compounds took place in the vapor mixture.

What is claimed is:

1. A method for the preparation of a metal halide in fine particulate form which comprises the steps of:
   (a) admixing a vapor of an exothermically decomposable organometallic compound having a density of molecules of the compound of at least $10^{15}$ molecules per $cm^3$ in the vapor phase with a reactant compound which is a halogen compound selected from the group consisting of molecular halogens, methyl halides and mixtures thereof; and
   (b) irradiating at least a part of the vapor phase with laser beams in a pulse having a width not exceeding $1 \times 10^{-3}$ seconds, and an energy density of at least $10^{-4}$ joules per $cm^2$ so as to produce activated species of the organometallic compound which starts an exothermic chain of the organometallic compound with the reactant compound to form the fine particles of the metal halide.

2. A method as in claim 1 wherein the concentration of the halogen containing compound in the vapor mixture is up to 4 times the molar concentration of the organometallic compound.

3. A method as in claim 2 wherein the metal halide formed is lead dichloride and the halogen containing compound is methyl chloride.

4. A method as in claim 2 wherein the metal halide formed is bismuth iodide and the halogen containing compound is methyl iodide.

5. A method as in claim 1 wherein the metal halide formed is lead diiodide and the halogen containing compound is methyl iodide.

6. A method as in claim 1 wherein the metal halide formed is lead bromide and the halogen containing compound is methyl bromide.

7. A method for the preparation of a composite metal compound containing at least two different metallic elements which comprises the steps of:
   (a) admixing a vapor of an exothermically decomposable organometallic compound having a density of molecules of the compound of at least $10^{15}$ molecules per $cm^3$ in a vapor phase with a reactant compound selected from the group consisting of organometalic compounds, metal hydrides, metal alkoxides, metal carbonyls, metallocene compounds, metal halides, metal hydroxides, metal oxides, metal carbides, metal nitrides and metal sulfides and mixtures thereof in which the metallic element is not the same as the metallic element of the organometallic compound; and
   (b) irradiating at least a part of the vapor phase with laser beams in a pulse having a width not exceeding $1 \times 10^{-3}$ seconds, and an energy density of at least $10^{-4}$ joules per $cm^2$ so as to produce activated species of the organometallic compound which starts an exothermic chain reaction of the organometallic compound with the reactant compound to form the fine particles of the composite metal compound.

8. A method as in claim 7 wherein the metal containing compound formed is a composite compound containing lead and bismuth, the exothermically decomposable organometallic compound is tetramethyl lead and the reactant compound is trimethyl bismuth.

9. A method as in claim 7 wherein the metal containing compound formed is a composite compound containing lead and tin, the exothermically decomposable organometallic compound is tetramethyl lead and the reactant compound is tetramethyl tin.

* * * * *

UNITED STATES PATENT AND TRADEMARK OFFICE
CERTIFICATE OF CORRECTION

PATENT NO. : 5,207,878
DATED : May 4, 1993
INVENTOR(S) : Nobuo Shimo, Masato Fujita It is certified that error appears in the above-indentified patent and that said Letters Patent is hereby corrected as shown below:

Column 13, line 21, "reaction" should be inserted after "chain".

Column 13, claims 3 and 4, "claim 2" should be --claim 1--.

Signed and Sealed this

Twelfth Day of July, 1994

*Attest:*

BRUCE LEHMAN

*Attesting Officer*  Commissioner of Patents and Trademarks